April 20, 1937. A. L. GOODKNIGHT 2,077,788
AIR BRAKE MECHANISM
Filed Dec. 12, 1935
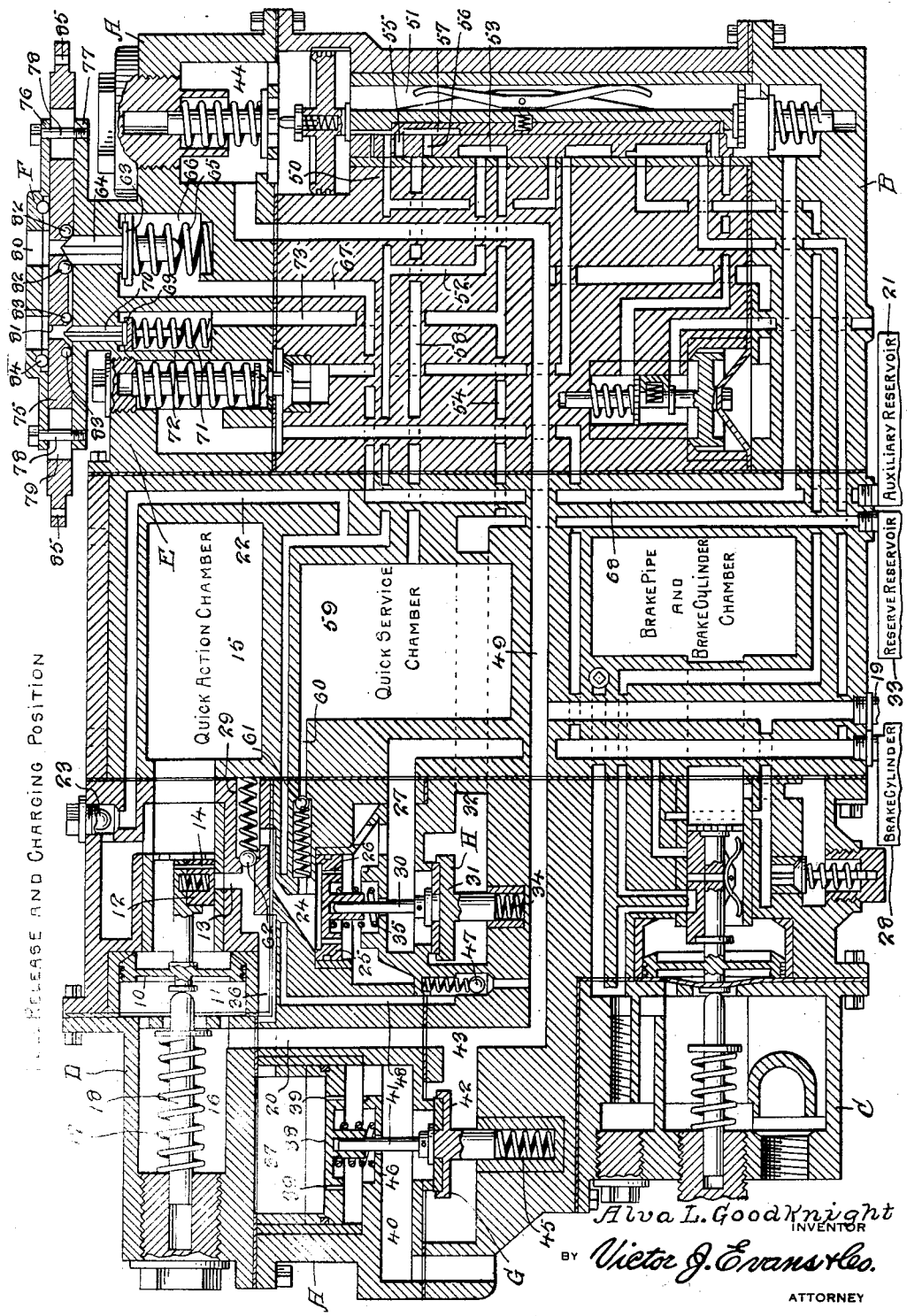

Patented Apr. 20, 1937

2,077,788

UNITED STATES PATENT OFFICE 2,077,788

AIR BRAKE MECHANISM

Alva L. Goodknight, Fort Worth, Tex.

Application December 12, 1935, Serial No. 54,137

13 Claims. (Cl. 303—27)

This invention relates to air brake mechanism of the general type described in my application for air brake mechanism, filed September 8, 1934, Serial No. 743,172.

An object of the present invention is to improve the above entitled air brake mechanism by providing anti-friction emergency poppet valves which are operated independently of the triple valve device and propagate emergency application independently of the triple valve device, these valves also eliminating the customary frictional resistance incident to slide valves and the like which resistance in some instances has been found to be as much as twenty three pounds.

A further object of the invention is to provide a manually pull or push slidable duplex release valve which may be operated from the exterior of the air brake mechanism to release pressure from the auxiliary reservoir when pulled or pushed a portion of its stroke and which will release both auxiliary reservoir pressure and reserve reservoir pressure when pulled or pushed the full length of its stroke.

A still further object is to provide check valves to prevent brake cylinder pressure from leaking into the quick service chamber so that the chamber will always be empty for quick service application and to prevent brake cylinder pressure from leaking to the atmosphere through the brake pipe vent valve.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of the specification,

The figure is a diagrammatic sectional view of an air brake mechanism constructed in accordance with the invention and showing the parts in normal release position.

Referring now to the drawing the air brake mechanism is shown to comprise a triple valve device A, auxiliary reservoir deplete device B, brake cylinder exhaust control device C, emergency valve device D, and brake cylinder maintaining device E. These parts are substantially the same in construction and operation as described in the above referred to application, and in carrying out the present invention a bleeding device for the auxiliary reservoir and the reserve reservoir is illustrated at F, and also poppet valves for accomplishing the first mentioned object of this specification are shown at G and H.

The emergency valve device comprises a piston 10 which works in a chamber 11 and is provided with a slide valve 12 which unseals a passage 13 in emergency application. The valve is provided with an equalizing port 14 which registers with the passage 13 in service application. The quick action chamber 15 is in communication with the housing of the valve 12 and fluid pressure from the chamber is exerted against one side of the piston 10. The other side of the piston is subjected to brake pipe pressure in a chamber 16, plus about ten pounds pressure of a spring 17, which is mounted on a plunger 18 that bears against the piston. The chamber 16 is subjected to pressure in the brake pipe 19 through a passage 20. The quick action chamber 15 is subjected to pressure in the auxiliary reservoir 21 through passages 50 and 22 also passage 48 which is controlled by a check valve 23.

In service application, when a reduction of more than ten pounds pressure is made in the brake pipe and in the chamber 16, the pressure in the quick action chamber 15 moves the piston 10 until the restricted port 14 in the slide valve registers with the passage 13 whereupon the pressure in the quick action chamber will reduce into the passage 13 until it reaches an excess pressure of about ten pounds more than the pressure in the brake pipe and auxiliary reservoir, due to the action of the spring 17. During emergency application the pressure in the quick action chamber 15 will move the piston 10 and valve 12 to their limit of movement whereupon the pressure in the quick action chamber will reduce into the passage 13 without restriction.

The poppet valve device H is operated by reduction of quick action chamber pressure into the passage 13. The passage 13 opens into the chamber 24 of a vent piston 25 which is provided with relief ports 26 which communicate with a passage 27 leading to the brake cylinder 28. The relief ports permit pressure upon the piston to reduce into the passage 27 and brake cylinder 28 during service application. In release position pressure upon the piston reduces through the relief ports into the brake cylinder then to the atmosphere.

The piston stem 30 carries a poppet valve 31 which controls a passage 32 leading to the reserve reservoir 33. A spring 34 tends constantly to hold the poppet valve seated and likewise a spring 35 on the piston stem constantly tends to hold the piston seated. During emergency application pressure from the quick action chamber 15 reduces through the passage 13 and moves the piston 25 which opens the poppet valve 31 whereupon pressure from the reserve reservoir 33 will flow through the passage 32 to the passage 27 and into the brake cylinder. When the pressure in chamber 24 reduces through the restricted relief ports 26 to equal with that in passage 27, the springs 34 and 35 will then automatically force the piston 25 and its vent valve 31 to assume its closed position.

In my above mentioned prior patent application, during emergency application the brake pipe pressure is let into the brake cylinder instead of reserve reservoir pressure as in the present patent application. The advantage of reserve reservoir pressure is, after a quick service or service application, and after release of the quick service or service application, a quicker and more effective emergency application can be obtained. For example, during a quick service or service application brake pipe and auxiliary reservoir pressures are reduced from a normal pressure of seventy pounds to sixty pounds or fifty pounds. In my invention there is yet held seventy pounds normal pressure in the reserve reservoir available for an emergency application and also available for the further purpose of assisting in recharging the auxiliary reservoir.

By using a poppet, or lift valve, instead of the slide valve customarily used, frictional resistance of the device H is reduced to a minimum. Heavy slide valve friction must be overcome before an emergency application can become effective. This friction is the cause of inability to obtain emergency application after the brake pipe and auxiliary reservoir pressures have been reduced during service application. By eliminating frictional resistance, I am able to obtain an emergency application much quicker than when frictional resistance must be first overcome, for the reason that I need only to unbalance pressures to obtain an instantaneous emergency application.

The poppet valve device G is also operated by reduction of quick action chamber pressure into the passage 13. The passage 13 opens into a passage 36 leading to a chamber 37 in which works a vent piston 38 which is provided with relief ports 39 that communicate with a passage 40 leading to the atmosphere. The relief ports permit pressure upon the piston to reduce into the passage 40 to the atmosphere during service application and after service application permit atmospheric pressure to equalize above and below the piston. The piston stem 41 carries a poppet valve 42 which controls a passage 43 leading to the piston chamber 44 of the triple valve device A which chamber is open to brake pipe pressure. The passage 43 also communicates with the passage 20 which leads to the chamber 16 in the emergency valve device D, which chamber is also open to brake pipe pressure. A spring 45 tends constantly to hold the poppet valve seated and likewise a spring 46 on the piston stem 41 constantly tends to hold the piston seated.

During emergency application pressure from the quick action chamber 15 reduces through the passages 13 and 36 into the chamber 37 and moves the piston 38 which in turn opens the poppet valve 42 whereupon brake pipe pressure from the chambers 44 and 16 and passages 20 and 43 will flow through the passage 40 into the atmosphere. When the brake pipe pressure is partly, or wholly reduced into the atmosphere the poppet valve 42 will automatically be closed by pressure of its spring 45 after the pressure in chamber 37 has escaped into the atmosphere through the restricted relief ports 39, while the piston 38 remains upon its downward seat.

It will thus be seen that during emergency application quick action chamber pressure will reduce through the passage 13 and divide, part flowing into the atmospheric vent piston chamber 37 and part flowing into the chamber 24 of the reserve reservoir vent piston 25. Thus both pistons are simultaneously moved to simultaneously open the poppet valves 42 and 31 whereby the brake pipe pressure is vented into the atmosphere and simultaneously therewith the reserve reservoir pressure is vented into the brake cylinder.

The advantage of the poppet valve 42, in addition to being substantially frictionless, is that its use propagates a quicker emergency application. For example, when the emergency application is initiated, the poppet valve 42 will locally vent the brake pipe air on each car of the train and hold the brake pipe open to the atmosphere until the pressure in the brake pipe is fully exhausted. Then both the poppet valves 42 and 31 and the emergency valve 12 will automatically close and be ready immediately for recharging and ready for another emergency application. It will be here pointed out that the emergency valve and both poppet valves automatically assume their release position following each emergency application of the brakes ready for another emergency action of the brakes. They do not need an increase of brake pipe pressure for their release.

It will be understood that when the poppet valves and the emergency valve return to release position they do not release the brakes. The brakes are held applied and are released by the triple valve device A and the brake cylinder control device C, as described in my above referred to prior application.

A check valve 47 controls an auxiliary reservoir charging passage 48 leading from the brake pipe passage 49 to a passage 50 which charges the auxiliary reservoir chamber 51 in the triple valve device A, there being a passage 52 branching from the passage 50 and through a cavity 53 in the triple valve device, charging the reserve reservoir through a passage 54. The check valve 47 permits pressure from the brake pipe moving in one direction through the above numbered passages but prevents retrograde movement of auxiliary reservoir pressure therefrom.

In quick service application, the quick service ports 55 and 56 of the triple valve device will conduct brake pipe pressure from the passage 50, through a cavity 57 in the triple valve to a passage 58 which communicates with a quick service chamber 59 of definite volume. Pressure from the chamber may pass through a passage 60 which is controlled by a check valve 61 into the chamber 24 above the piston 25, and if the brake cylinder pressure is less than the pressure in the quick service chamber the latter can leak through the ports 26 of the piston into the passage 27 and from thence into the brake cylinder without operating said piston. If, however, the pressure in the brake cylinder is greater than the pressure in the quick service chamber this greater pressure cannot enter the chamber since it will seat the check valve 61.

Brake cylinder pressure passing through the ports 26 in the chamber 24 and into the passaage 29 is prevented from escaping to atmosphere through the passage 36 by means of a check valve

62. This check valve of course is unseated during emergency application and also during service application when pressure from the quick action chamber reduces through the passage 13 into the passage 29 to enter the chamber 24.

Referring now to the reservoir manually slidable duplex release valve device F for releasing pressure from the auxiliary reservoir and from the reserve reservoir into the atmosphere, 63 designates a valve having a cruciform stem 64, the wings of which form air passages between them. The stem terminates in a pointed tip. A spring 65 is seated in a chamber 66 and tends constantly to hold the valve closed. The chamber communicates with a passage 67 which in turn communicates with a passage 68 which leads to the auxiliary reservoir 21.

A similar valve 69 is provided with a cruciform stem 70 having air passages between its wings and the valve is held closed by a spring 71 seated in the chamber 72 which communicates with the reserve reservoir 33.

For manually opening the valves 63 and 69 a plate 75 is slidably mounted between guide flanges 76 and 77 exteriorly of the valves and is limited in sliding movement in either direction by stop bolts 78 which pass through slots 79 in the sliding plate and are terminally connected to the guide flanges. The sliding plate is provided with ports 80 and 81 which overlie respectively the air passages of the valve stems 64 and 70 and vent these passages to the atmosphere.

A pair of cam rollers 82 are mounted in the face of the sliding plate and normally engage the low ends of the pointed tip of the valve stem 64. Manual pull or push movement of the plate 75 through a portion of its stroke in either direction will cause one of the pair of cam rollers 82 to ride upon the inclined cam edges of the pointed tip of the valve stem 64 and depress the stem to open the valve, thereby venting the auxiliary reservoir 21 through the passages 68, 67, chamber 66, air spaces in the valve stem 64, and port 80 to the atmosphere.

Likewise a pair of cam rollers 83 are arranged in the space of the plate 75 close to but not touching the pointed end of the valve stem 70. During movement of the plate 75 to the complete limit of its stroke in either direction, one of the rollers 83 will ride upon the inclined cam faces of the valve stem 70 and depress the valve stem to open the valve 69 while at the same time the other valve 63 is being simultaneously held open as above described by its associated roll 82. Thus the reserve reservoir 33 will be simultaneously vented to the atmosphere through the passage 54, passage 73, chamber 72, air spaces in the cruciform stem 70 and port 81 to the atmosphere.

To eliminate friction of the plate 75 against the guide flange 76 anti-friction rollers 84 are mounted between the opposed surfaces of the plate of the flange. To attach rods 85' to the plate for manipulating the plates from the sides of the cars openings 85 are formed in the ends of the plate. It is a well known fact that the tilting type of reservoir manual release valves will sometimes stick open after pulled or pushed open by an operator to bleed the pressure from the reservoir to release a stuck brake, the valve that fails to close after its rod is released by the operator will leak the pressure from the reservoir and thus render the brake impotent to function, which is due to the difficulty of frictional and gummy, dirty surfaces of the device.

My reservoir manual duplex release valve is an improvement over the tilting type of reservoir release valves, for the reason that it eliminates all frictional surfaces of the device that would become gummy and dirty by employing a slidable cam plate on anti-friction cam rollers that partly ride and tread the bevelled ends of the release valves when the rod and its plate is pulled or pushed to compress the springs to open one or both of said valves to bleed the reservoir to release a stuck brake. Then when the rod and its plate is released by the operator, the rollers and their plate are automatically forced back again by the bevelled ends of the valves with the expansion of their springs to normal closed position without frictional resistance or any liability of the valves sticking open to leak the pressure from the reservoir into the atmosphere and thus render the brake impotent to function and therefore inoperative when needed.

It will be further understood that the normal application and abnormal high pressure compensating valve in section E, coacts with the brake cylinder pressure, and that the exhaust control normal application and abnormal low compensating valve device in section C, coacts with the brake pipe and brake cylinder pressure, and are, however in combination through the brake cylinder ports and therefore coact together to compensate for brake cylinder leakage after the brake pipe pressure reduces to approximately 50 pounds more or less brake cylinder and brake pipe pressures which avoids a gap space between the two valves and provides for a continuous compensation for brake cylinder leakage. In other words, the high and low pressure compensation features slightly lap over to insure continuous operation of the valves.

Since the operation of the parts has been described as the description of the parts progressed it is thought that the construction and operation of my invention will be fully understood without further explanation.

What is claimed is:

1. In an air brake, in combination, a brake pipe, a quick action chamber, a reserve reservoir, a brake cylinder, an emergency valve and piston therefor, subjected to brake pipe pressure and a constantly coacting spring on one side, and subjected to quick action chamber pressure on the other side, and means operated by said emergency valve with quick action chamber pressure to connect the reserve reservoir with the brake cylinder.

2. In an air brake, in combination, a brake pipe, a quick action chamber, a reserve reservoir, a brake cylinder, an emergency valve and piston therefor, subjected to brake pipe pressure and a constantly coacting spring on one side, and subjected to quick action chamber pressure on the other side, means operated by said emergency valve with quick action chamber pressure to connect the brake cylinder to the reserve reservoir, and means also operated by said emergency valve with said quick action chamber pressure for venting the brake pipe and quick action chamber pressures to the atmosphere simultaneously with the actuation of the first named means.

3. In an air brake, in combination, a brake pipe, a quick action chamber, an emergency valve and piston therefor, controlling release of quick action chamber pressure, a reserve reservoir, a brake cylinder, said emergency valve and piston therefor, subjected to brake pipe pressure and a constantly coacting spring on one side, and subjected to quick action chamber pressure on the other side, means operated by said emergency valve with quick action chamber pressure to connect the brake cylinder with the reserve reservoir, means for returning the emergency valve and the first named means to release position after each actuation, and means for holding pressure in the brake cylinder after return of the first named means to release position.

4. In an air brake, in combination, a brake pipe, a quick action chamber, an emergency valve and piston therefor controlling release of quick action chamber pressure, a reserve reservoir, a brake cylinder, said emergency valve subjected to brake pipe pressure and a constantly coacting spring on one side and subjected to quick action chamber pressure on the other side, means operated by said emergency valve with quick action chamber pressure to connect the brake cylinder with the reserve reservoir, means for returning the emergency valve and the first-named means to release position after each actuation, means for holding pressure in the brake cylinder after return of the first-named means to release position, and means for releasing pressure in the brake cylinder.

5. In an air brake, in combination, a brake pipe, a reserve reservoir, a quick action chamber, a brake cylinder, an emergency valve and piston therefor, subjected to quick action chamber pressure on one side and subjected on the other side to brake pipe pressure and a constantly coacting spring for controlling release of a portion of quick action chamber pressure, and means for simultaneously venting quick action chamber pressure into the atmosphere and prevent a vent of emergency application pressure from the reserve reservoir into the brake cylinder during service application.

6. In an air brake, in combination, a brake pipe, a quick action chamber, a reserve reservoir, a brake cylinder, an emergency valve and piston therefor, controlling release of quick action chamber pressure, subjected to brake pipe pressure and a constantly coacting spring on one side and subjected to quick action chamber pressure on the other side, and means including a poppet valve operated by said emergency valve with quick action chamber pressure to connect the reserve reservoir with the brake cylinder.

7. In an air brake, in combination, a brake pipe, a quick action chamber, a reserve reservoir, a brake cylinder, an emergency valve and piston therefor, controlling release of quick action chamber pressure, subjected to brake pipe pressure and a constantly coacting spring on one side, and subjected to quick action chamber pressure on the other side, means including a poppet valve operated by said emergency valve with quick action chamber pressure to connect the brake cylinder to the reserve reservoir, means including a poppet valve, also operated by said emergency valve with said quick action chamber pressure for venting the brake pipe and the quick action chamber pressures to the atmosphere simultaneously with the actuation of the first named means, and means for returning the emergency valve and the two poppet valves to release position after each actuation.

8. In an air brake, in combination, a brake pipe, a quick action chamber, an emergency valve and piston therefor controlling release of quick action chamber pressure, a reserve reservoir, a brake cylinder, said emergency valve subjected to brake pipe pressure and a constantly coacting spring on one side, and subjected to quick action chamber pressure on the other side, means including a poppet valve operated by said emergency valve with quick action chamber pressure to connect the brake cylinder with the reserve reservoir, means including a poppet valve operated by said emergency valve with said quick action chamber pressure for venting the brake pipe and a portion of said quick action chamber pressure to the atmosphere simultaneously with the actuation of the first-named means, springs for returning the emergency valve and the two poppet valves to release position after each actuation, and a check valve for holding pressure in the brake cylinder after return of the emergency valve and two poppet valves to release position.

9. In an air brake, in combination, a brake pipe, a quick action chamber, an emergency valve and piston therefor controlling release of quick action chamber pressure, a triple valve device, an exhaust control device, a reserve reservoir, a brake cylinder, said emergency valve subjected to brake pipe pressure and a constantly coacting spring on one side and subjected to quick action chamber pressure on the other side, means including a poppet valve operated by said emergency valve with quick action chamber pressure to connect the brake cylinder with the reserve reservoir, springs for returning the emergency valve and the poppet valve to release position after each actuation, a check valve for holding pressure in the brake cylinder after return of the emergency valve and poppet valve to release position, and a brake pipe and brake cylinder actuated exhaust control device in combination and coacting with the triple valve device for releasing excess application pressure in the brake cylinder.

10. In an air brake, in combination, a brake pipe, a reserve reservoir, a quick action chamber, a brake cylinder, a piston operated valve controlled passage connecting the quick action chamber with the brake cylinder, a check valve and a poppet valve and piston therefor having restricted relief ports therein incorporated in said passage and a passage leading from the said quick action chamber passage connecting the said quick action chamber to the atmosphere, a poppet valve and piston therefor having restricted relief ports therein incorporated in said passage for reducing a portion of quick action chamber pressure into the atmosphere during service application, and means constantly coacting with brake pipe pressure to prevent a vent of emergency application pressure from the reserve reservoir into the brake cylinder during service application.

11. In an air brake, in combination, a brake pipe, a brake cylinder, a quick service chamber adapted for reducing brake pipe pressure to cause a quick service application and constantly coact with brake cylinder pressure to minimize cylinder leakage, means for preventing brake cylinder pressure from passing into the quick service chamber, means for preventing brake cylinder pressure from venting to the atmosphere in application position of the brake, and means for causing a light application slightly in advance of the emergency application.

12. In an air brake, in combination, a brake cylinder, a quick service chamber, a check valve controlled passage connecting the brake cylinder with the quick service chamber, and through which brake cylinder pressure is checked from passing into the quick service chamber, and a check valve controlled passage through which brake cylinder pressure is checked from venting to the atmosphere in application position of the brake.

13. In an air brake, in combination, a brake pipe, an auxiliary reservoir, a quick action chamber, a reserve reservoir, a brake cylinder, an emergency actuating valve and piston therefor controlling release of quick action chamber pressure, subjected to brake pipe pressure and a constantly coacting spring on one side, and subjected to quick action chamber pressure on the other side, means including a poppet valve operated by said emergency actuating valve with quick action chamber pressure to connect the brake cylinder to the reserve reservoir, means including a poppet valve also operated by said emergency actuating valve with said quick action chamber pressure for venting the brake pipe and quick action chamber pressures to the atmosphere simultaneously with the actuation of the first-named means, and means for automatically returning the emergency actuating valve and the two poppet valves to release position during the application of the brakes.

ALVA L. GOODKNIGHT.